(12) United States Patent
Lenef et al.

(10) Patent No.: US 12,117,649 B2
(45) Date of Patent: Oct. 15, 2024

(54) METHOD FOR PRODUCING A PLANAR LIGHT CIRCUIT AND PLANAR LIGHT CIRCUIT

(71) Applicant: ams-OSRAM International GmbH, Regensburg (DE)

(72) Inventors: Alan Lenef, Belmont, MA (US); James Whitehead, Seattle, WA (US)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 0 days.

(21) Appl. No.: 17/835,141

(22) Filed: Jun. 8, 2022

(65) Prior Publication Data

US 2023/0400636 A1 Dec. 14, 2023

(51) Int. Cl.
*G02B 6/13* (2006.01)
*G02B 6/125* (2006.01)
*G02B 6/132* (2006.01)
*G02B 6/136* (2006.01)
*G02B 6/12* (2006.01)

(52) U.S. Cl.
CPC ............. *G02B 6/136* (2013.01); *G02B 6/125* (2013.01); *G02B 6/132* (2013.01); *G02B 2006/12061* (2013.01); *G02B 2006/12173* (2013.01)

(58) Field of Classification Search
CPC ........ G02B 6/136; G02B 6/125; G02B 6/132; G02B 2006/12061; G02B 2006/12173
USPC ....................................................... 385/129
See application file for complete search history.

(56) References Cited

U.S. PATENT DOCUMENTS

| 6,225,191 | B1 | 5/2001 | Ahlquist et al. |
| 6,316,820 | B1 | 11/2001 | Schmitz et al. |
| 6,946,238 | B2 | 9/2005 | Zhang et al. |
| 2003/0176002 | A1* | 9/2003 | Zhang ................... G02B 6/132 438/22 |
| 2003/0209718 | A1* | 11/2003 | Nir ...................... G02B 6/12004 385/42 |
| 2020/0018900 | A1 | 1/2020 | Ptasinski et al. |

FOREIGN PATENT DOCUMENTS

| CN | 102023455 A | * | 4/2011 | ............... G02F 3/00 |
| WO | WO-2007133915 A1 | * | 11/2007 | ............. G02B 6/122 |

OTHER PUBLICATIONS

AZ Electronic Materials: "AZ® Developer, 400K, and 421K Inorganic Developers," Datasheet, (date unknown), 4 pages.

(Continued)

*Primary Examiner* — Jerry M Blevins
(74) *Attorney, Agent, or Firm* — MH2 Technology Law Group LLP

(57) ABSTRACT

A method for producing a planar light circuit is specified. The method comprises: providing a substrate free of light producing regions, depositing a waveguide layer, applying a photostructurable mask on the waveguide layer, photostructuring of the photostructurable mask such that the photostructurable mask is removed in regions, etching of the waveguide layer in the regions such that channels are produced in the waveguide layer, wherein the channels confine waveguides, removal of the photostructurable mask layer, and singulating into a planar light circuit. Furthermore, a planar light circuit is specified.

10 Claims, 11 Drawing Sheets

(56) References Cited

OTHER PUBLICATIONS

AZ Electronic Materials: "AZ® P4620 Photoresist Data Package" (date unknown), 27 pages.

Gorin et al., "Fabrication of silicon nitride waveguides for visible-light using PECVD: a study of the effect of plasma frequency on optical properties," Optics Express, vol. 16, No. 18, Sep. 1, 2008, pp. 13509-13516.

Lacava et al., "Si-rich Silicon Nitride for Nonlinear Signal Processing Applications," Nature: Scientific Reports, 7, Article No. 22, 2017 pp. 1-13.

Lenef et al., "Thermodynamics of Light Extraction from Luminescent Materials," ECS Journal of Solid State Science and Technology, 7 (1) R3211-R3226 (2018).

Mackel et al.,"Detailed study of the composition of hydrogenated SiNx layers for high-quality silicon surface passivation," Journal of Applied Physics, vol. 92, No. 5, Sep. 1, 2002, pp. 2602-2609.

Merck, "Technical Datasheet—AZ® P4000 Series," Rev. 8/21, 7 pages.

MicroChemicals, "Rehydration," Basics of Microstructuring, 7 pages, https://www.microchemicals.com/technical_information/photoresist_rehydration.pdf.

OSRAM Opto Semiconductors GmbH, "PLT5 522EA_P" Metal Can® TO56 / Green Laser Diode in TO56 Package; Version a.2, Feb. 2, 2021; 16 pages.

Romero-Garcia et al., "Photonic integrated circuits for multi-color laser engines," Proceedings of Spie, vol. 10108, Silicon Photonics XII, pp. 10108Z-1-10108Z-11, Mar. 2, 2017; doi: 10.1117/12.2250758.

Lenef et al., "Optoelectronic Semiconductor Device and Glasses," U.S. Appl. No. 17/482,740, filed Sep. 23, 2021.

Wikipedia, "Mercury-vapor lamp," https://en.wikipedia.org/wiki/Mercury-vapor_lamp, Mar. 20, 2022 version.

Verbandt, Y. (Authorized officer), International Search Report and Written Opinion issued in International Patent Application No. PCT/EP2023/064551 dated Sep. 1, 2023.

\* cited by examiner

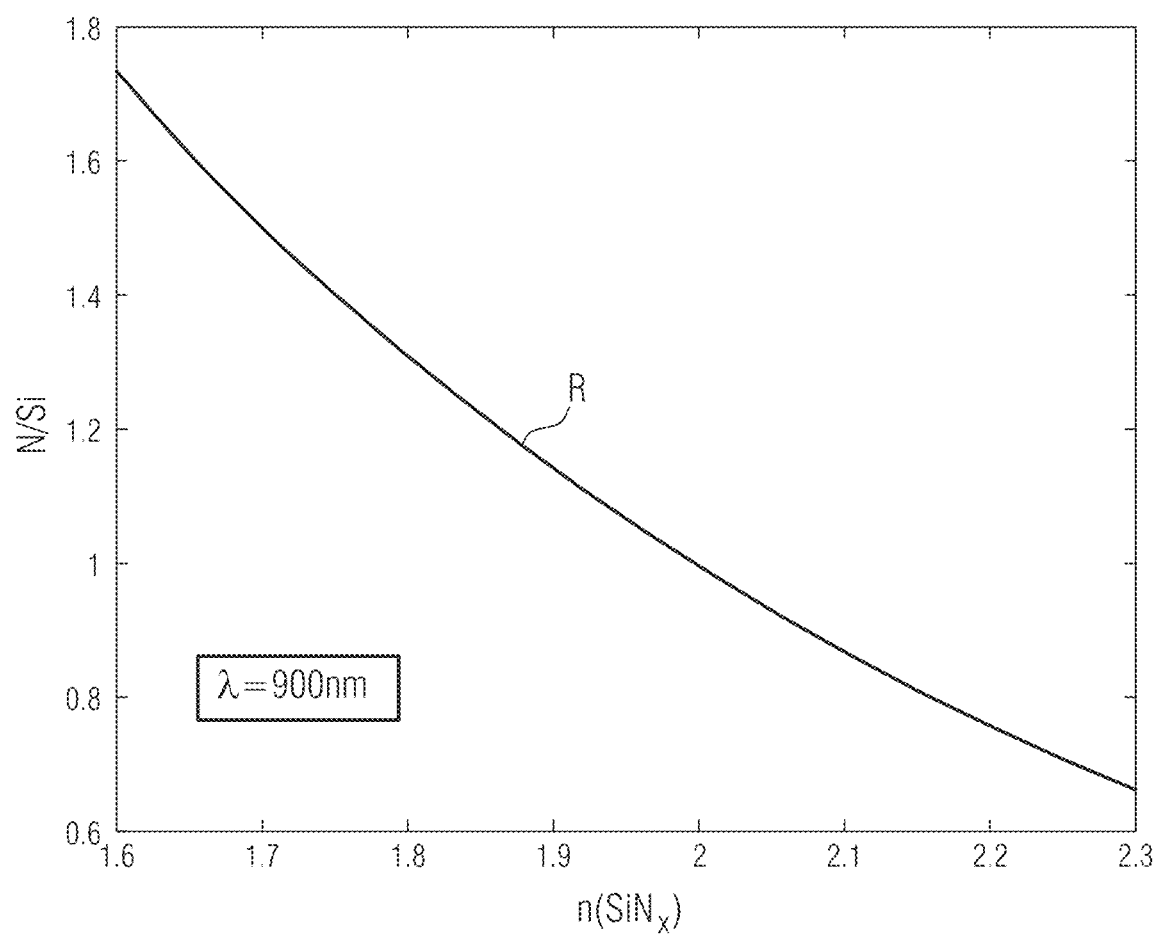

METHOD FOR PRODUCING A PLANAR LIGHT CIRCUIT AND PLANAR LIGHT CIRCUIT

FIELD OF THE INVENTION

A method for producing a planar light circuit and a planar light circuit are specified.

BACKGROUND OF THE INVENTION

U.S. patent application Ser. No. 17/482,740 describes an optoelectronic semiconductor device with semiconductor laser. The disclosure content of this application is incorporated by reference hereby.

It is an object to provide an efficient method for producing a planar light circuit. Furthermore, a planar light circuit with improved properties shall be provided.

In particular, here and in the following a planar light circuit is understood as an optical waveguide circuit, for example combining multiple laser outputs. This is to differentiate from the 'waveguide combiner' structure in augmented reality (AR) glasses that spread an image information over a surface of the AR glasses enhancing the eyebox.

SUMMARY OF THE INVENTION

According to at least one embodiment, a method for producing a planar light circuit comprises providing a substrate. In particular, the substrate is free of light producing regions. In other words, the substrate is not designed to produce electromagnetic radiation. In some embodiments, the substrate comprises a material which is transparent to electromagnetic radiation in the visible wavelength range.

For example, the substrate is formed as a wafer. In this way, a plurality of planar light circuits can be produced. In some embodiments, the substrate is coated with a transparent interlayer which is transparent to the visible wavelength range. Advantageously, the substrate is easily cleaved.

According to at least one embodiment of the method, a waveguide layer is deposited. In particular, the waveguide layer is deposited, preferably directly, on the substrate. Preferably, the waveguide layer comprises or consists of a material with a high refractive index, for example with a refractive index of 1.8 to 2.5, both inclusive. Particularly preferably, the refractive index of the material of the waveguide layer is higher than the refractive index of a material of the substrate. For example, a thermal expansion coefficient of the material of the substrate is similar to a thermal expansion coefficient of the material of the waveguide layer. For example the coefficients of thermal expansion of the material of the substrate and the material of the waveguide layer differ by at most +/−10%. Preferably, the substrate is able to mechanically stabilize the waveguide layer.

According to at least one embodiment of the method, a photostructurable mask is applied on the waveguide layer. In particular, the photostructurable mask changes its structure and/or composition under exposure to electromagnetic radiation.

According to at least one embodiment of the method, the photostructurable mask is photostructured such that the photostructurable mask is removed in regions. That is, the regions are preferably free of the photostructurable mask after photostructuring. During photostructuring, the photostructurable mask is, in particular, exposed to electromagnetic radiation, for example UV light. After an exposure to the electromagnetic radiation, the photostructurable mask is developed by a developer reagent such that the photostructurable mask is removed in regions. In particular, in the regions wherein the photostructurable mask is removed the waveguide layer is exposed.

One can also structure the waveguide mask using other lithography methods, including electron-beam lithography and nano-imprint lithography.

According to at least one embodiment of the method, the waveguide layer is etched in the regions such that channels are produced in the waveguide layer. In particular, the channels confine waveguides. Preferably, each channel is directly adjacent to a waveguide. The channels reach, for example, completely through the waveguide layer. That is, a bottom of the channels is then formed by the substrate. For example, an etch rate of the photostructurable mask is less than an etch rate of the waveguide layer.

During other methods for producing a planar light circuit everything of the waveguide layer but the waveguides are etched away. As only channels are produced in the waveguide layer by etching, a majority of the waveguide layer remains advantageously on the substrate. Thus, a more mechanically robust planar light circuit can be produced and etch artifacts are prevented. The planar light circuit described herein is also suitable for flip-chip configurations in which regions outside of the channels are metallized for soldering or bonding to a substrate.

According to at least one embodiment of the method, the photostructurable mask is removed, in particular completely. The photostructurable mask is, for example, removed using an acid such as sulfuric acid.

According to at least one embodiment of the method, the substrate with the waveguide layer is singulated into a planar light circuit. In particular, the singulation is performed by cleaving, etching, mechanical dicing, or laser dicing.

According to at least one embodiment, the method for producing a planar light circuit comprises:

providing a substrate free of light producing regions,
depositing a waveguide layer,
applying a photostructurable mask on the waveguide layer,
photostructuring of the photostructurable mask such that the photostructurable mask is removed in regions,
etching of the waveguide layer in the regions such that channels are produced in the waveguide layer, wherein the channels confine waveguides,
removal of the photostructurable mask, and
singulating into a planar light circuit. Preferably, the steps are carried out in the given order.

By using the photostructurable mask to selectively etch channels into the waveguide layer, internal reflections that occur during photostructuring and cause distortions and defects of the desired final structure are advantageously minimized. In particular, due to minimization of defects, the waveguides of the planar light circuit produced by this method show small amounts of scattering. It is possible that the small amounts of scattering couple initial modes excited by a laser diode field to a large portion of the waveguide modes such that a waveguide output is illuminated with a more homogeneous light distribution irrespective of an input laser diode position.

According to at least one embodiment of the method, a thickness of the photostructurable mask is such that the photostructurable mask is not completely etched away during etching of the waveguide layer. In particular, an etch rate of the photostructurable mask (Erate(mask)) is close to an etch rate of the waveguide layer (Erate(layer)). In this case, the thickness of the photostructurable mask ($t_{mask}$) is preferably larger than a thickness of the waveguide layer ($t_{layer}$) However, if the thickness of the photostructurable mask is too great, there is possible loss of fidelity in the etching. For example, the thickness of the photostructurable layer is in a region determined by the following equation:

$$1.1 \frac{Erate(\text{mask})}{Erate(\text{layer})} t_{layer} < t_{mask} < 2 \frac{Erate(\text{mask})}{Erate(\text{layer})} t_{layer}.$$

According to at least one embodiment of the method, the waveguide layer comprises or consists of a material selected from the following group: $SiN_x$, $SiO_xN_y$, GaN, $HfO_2$, $LiNbO_3$, $Ta_2O_5$, $Nb_2O_5$, $HfO_2$, $TiO_2$, Si and mixtures thereof. Additionally or alternatively, other etchable materials with a high refractive index can be used in the waveguide layer. It is possible that the Si is epitaxial or amorphous. A waveguide layer comprising Si is advantageously used for infrared applications. However, the high refractive index of Si may lead to fully hemispherical output far-field distributions. That is, the output of the waveguide may have an unacceptably high numerical aperture (NA).

In particular, the waveguide layer comprises or consists of $SiN_x$. Advantageously, $SiN_x$ is easily available, deposited, and etched. $SiN_x$ comprises a high refractive index, in particular a refractive index of between and including 1.85 and 2.0, preferably of between and including 1.90 and 2.0. In some cases, by making larger changes in a ratio of Si to N it is possible to obtain materials with a refractive index below 1.8 and above 3.0, depending on the wavelength. Due to the high refractive index, $SiN_x$ preferably has a high refractive index contrast to surrounding materials such as air or $SiO_2$. This can increase a confinement and a number of allowable modes for a given cross-section area. The increased number of allowable modes advantageously helps to relax alignment issues and relaxes constraints on input coupling structure designs. This aids reduction of a spatial coherence. Furthermore, the planar light circuit with a waveguide layer comprising $SiN_x$ is highly compatible with low-cost complementary metal-oxide-semiconductor (CMOS) based manufacturing.

Preferably, the waveguide layer comprises or consists of Si-poor $SiN_x$. In particular, Si-poor $SiN_x$ comprises a lower number of Si—Si bonds compared to stoichiometric $Si_3N_4$. This advantageously increases an optical quality of the $SiN_x$ as absorption of visible light is reduced. In particular, an absorption band of the $SiN_x$ is shifted from the visible region into the UV region of the electromagnetic spectrum due to the lower number of Si—Si bonds. The number of Si—Si bonds can be determined using IR spectroscopy. Additionally or alternatively, a composition of the $SiN_x$ may be determined using the refractive index.

According to at least one embodiment of the method, the waveguide layer is treated with surface plasma activation, in particular before applying the photostructurable mask. In particular, oxygen and methane are used as reactants during surface plasma activation. This step is performed to increase an adhesion of the photostructurable mask on the waveguide layer.

According to at least one embodiment of the method, an adhesion layer is deposited on the waveguide layer before applying the photostructurable mask. The adhesion layer particularly comprises or consists of $SiO_2$. The adhesion layer can increase an adhesion of the photostructurable mask on the waveguide layer. In this way, a plasma surface activation of the waveguide layer is advantageously omitted.

For example, the adhesion layer is applied using plasma-enhanced chemical vapor deposition (PECVD). In particular, the adhesion layer comprises a thickness of between and including 5 nanometers to 20 nanometers, for example around 10 nanometers.

According to at least one embodiment of the method, an adhesion promoter is applied on the waveguide layer before applying the photostructurable mask layer. For example, hexamethyldisilazane (HMDS) is used as adhesion promoter. In particular, the adhesion promoter is applied after depositing the adhesion layer. In other words, the adhesion promoter is applied on the adhesion layer. The adhesion promoter is, for example, applied using a spin coating process.

According to at least one embodiment of the method, the waveguide layer is deposited by plasma-enhanced chemical vapor deposition (PECVD). With this deposition method a waveguide layer having a thickness of at least 500 nanometers may be applied on the substrate. In particular, the waveguide layer, preferably comprising SiN., deposited by PECVD shows a low attenuation and/or is compressively stressed. The waveguide layer having a low attenuation has advantageously improved optical properties. Furthermore, a compressive stress advantageously allows a waveguide layer having a thickness of at least 500 nanometers.

According to at least one embodiment of the method, a low frequency plasma source is used during the plasma-enhanced chemical vapor deposition. With the low frequency plasma source a waveguide layer with an increased compressive stress is in particular deposited. The compressive stress counteracts, for example, an intrinsic tensile stress observable in waveguide layers having a thickness of at least 500 nanometers deposited by other methods. The compressive stress can be determined by polarized microscopy.

In particular, an amount of time that the low frequency plasma source is on during PECVD is between and including 20% to 50%, preferably between and including 30% to 40%, for example about 35%. An amount of time that a high frequency plasma source is on during PECVD is, in particular, between and including 50% to 80%, preferably between and including 60% to 70%, for example about 65%.

With PECVD, especially using a low frequency plasma source, it is possible to deposit a high quality waveguide layer. Low quality waveguide layers are, for example, non-uniform which causes scattering, especially at shorter wavelengths.

According to at least one embodiment of the method, during PECVD a $NH_3$ flow of between and including 20 sccm and 60 sccm, in particular of between and including 30 sccm and 50 sccm, for example of about 40 sccm was applied. Additionally or alternatively, it is possible to apply a flow of 5% SiH4 in Ar during PECVD of between and including 130 sccm and 190 sccm, in particular of between and including 140 sccm and 180 sccm, for example of about 160 sccm.

Other recipes for $SiN_x$ can have a high silicon content which could lead to a waveguide layer having higher losses at visible wavelengths.

According to at least one embodiment of the method, a surface of the substrate is cleaned before depositing the waveguide layer. In particular, the surface of the substrate is cleaned by a plasma cleaning. For example, $N_2O$ is used during cleaning the substrate.

According to at least one embodiment of the method, the waveguide layer is etched by inductively coupled plasma etching. Inductively coupled plasma etching is, in particular, a highly selective etching method. It is possible to use at least one of the following process gases during inductively coupled plasma etching: $SF_6$, $CHF_3$, $C_4F_8$, $CF_4$, $CH_2F_2$, $O_2$, Ar. $CF_4/O_2$ and $CH_2F_2/O_2$ as well as $CF_4$, $CHF_3$ and Ar may be used in combination. The combination of $CF_4/O_2$ and $CH_2F_2/O_2$ advantageously reduced polymerization of byproducts.

According to at least one embodiment of the method, a reaction chamber for the inductively coupled plasma etching is cleaned before etching the waveguide layer. A cleaned reaction chamber ensures that the plasma strikes on the waveguide layer and that the plasma does not extinguish during etching. In particular, the reaction chamber is cleaned using at least one of the following process gases: $O_2$, $SF_6$, $CHF_3$, $C_4F_8$, $CF_4$, $CH_2F_2$.

According to at least one embodiment of the method, a cladding is applied on the waveguide layer after removal of the photostructurable mask. The cladding is advantageously applied to reduce a sensitivity of the waveguide layer and especially the waveguide to dust. Furthermore, a breaking of the waveguides can be prevented during singulation if the cladding is present. The cladding may also increase the efficiency of the planar light circuit. Finally, the cladding reduces the waveguide index contrast compared to air, reducing the numerical aperture which can be advantageous in many applications.

In particular, the cladding is applied using PECVD. For example, at least one of the following reactants is used during applying the cladding: $SiH_4$, $CF_4$, $N_2O$. Advantageously, $CF_4$ increases a conformality of the cladding by reactive etchback. That is, the cladding is deposited and etched at the same time.

Furthermore, a planar light circuit is specified. In particular, the planar light circuit is produced by the method described herein. Thus, all features and embodiments described in combination with the method also apply to the planar light circuit and vice versa.

According to at least one embodiment, the planar light circuit comprises a substrate free of light producing regions and a waveguide layer on the substrate. In particular, the waveguide layer comprises channels confining a waveguide. For example, the waveguide is a ridge waveguide.

Preferably, the waveguide layer is transparent to electromagnetic radiation in the visible to infrared range of the electromagnetic spectrum. For example, the waveguide layer and thus also the waveguide is transparent to electromagnetic radiation between and including 405 nanometers and 780 nanometers, preferably between and including 450 nanometers and 650 nanometers. In other words, the planar light circuit can be designed for the application in the visible range of the electromagnetic spectrum.

According to at least one embodiment of the planar light circuit, the waveguide is a multi-mode waveguide. In particular, using a multi-mode waveguide alleviates alignment issues of the planar light circuit with a coupled laser diode compared to a single mode waveguide.

Other planar light circuit approaches assume that an emission point must be single mode to avoid unwanted speckle-like effect from multi-mode waveguides. This means that laser diode alignment into a single mode waveguide is highly difficult, requiring positioning of the laser diode emission points to well below one wavelength. A misalignment may cause significant efficiency losses. The highest sensitivity to alignment of other planar light circuits can also cause low production yields. Furthermore, combining multiple waveguide into a single waveguide can lead to significant efficiency losses using single mode waveguides.

Thus, other planar light circuits often do not actually combine waveguides for red, green and blue electromagnetic radiation to a single waveguide; rather they simply bring the output of each red, green, and blue waveguide close together at the emission side. Therefore, a true single emission point is often not achieved with the other planar light circuits using single mode waveguides. In other cases, single mode waveguide branches are combined in planar light circuits using various techniques, including evanescent couplers or multi-mode interference couplers. However, these structures require careful design and fabrication tolerances.

The planar light circuit described herein, in particular with the multi-mode waveguide, advantageously reduces tolerance restrictions on laser diode alignment, for example lateral laser diode alignment. In particular, this increases manufacturing yields and efficiency.

According to at least one embodiment of the planar light circuit, the waveguide is a single mode waveguide. A planar light circuit with a single mode waveguide may be used in applications where coherence and low optical loss are required. In this case, resonators, non-linear structure, and interferometers might be added.

According to at least one embodiment of the planar light circuit, the substrate comprises or consists of a transparent or opaque inorganic material selected from the group consisting of: fused silica, sapphire, YAG, $MgF_2$, AlN, various glasses, single crystal semiconductor based materials. In particular, single crystal semiconductor based materials are lower bandgap semiconductor based materials and/or are selected from the group consisting of: GaN, AlGaN, SiC, Ge, GaAs, AlGaAs, InP, silicon. Preferably, the substrate shows a strong absorbance of ultraviolet light which is of advantage for a photostructuring of a photostructurable mask arranged consecutively to the substrate. Note in the case of an absorbing substrate, the substrate must also have a transparent interlayer of lower refractive index than the waveguide material.

The substrate comprising a fused silica is, in particular, transparent to visible light. Thus, it is possible to perform a backside alignment with visible light cameras.

The substrate comprising lower bandgap semiconductor based materials may be aligned using infrared optics. The substrate comprising semiconductor based materials preferably has the advantages that it is easily cleaved for facet fabrication, that it has a good thermal conductivity, and that it absorbs stray light and scattered light. Furthermore, the substrate comprising semiconductor based materials allows, for example, for etching of precise alignment fiducials, trenches, and other features to aid alignment and integration of optical components such as laser diodes and collimating optics based on wafer-level refractive optics, diffractive optics, or metaoptics. If the waveguide layer comprises $SiN_x$, the substrate comprising semiconductor based materials may also be of advantage as the thermal expansion coefficient of semiconductor based materials is close to the thermal expansion coefficient of $SiN_x$.

According to at least one embodiment of the planar light circuit, the substrate comprises an interlayer. A material of the interlayer is in particular selected from the group consisting of oxides and fluorides. For example, the material of the interlayer is selected from the group consisting of: $SiO_2$, $Al_2O_3$, $MgF_2$, $LiCaAlF_6$, SiO, $GeO_2$. Preferably, the interlayer is transparent and comprises a low optical absorptivity. In particular, a thickness of the interlayer is between and including 1 micrometer to 5 micrometers, in particular of between and including 1 micrometer to 3 micrometers. Such a thickness is preferred in the case the waveguide is used for visible electromagnetic radiation. More generally, an evanescent tail of a waveguide mode must not interact with the substrate. At a minimum, the interlayer thickness $\delta_{inter}$ must satisfy, for example, $$\delta_{inter} > \frac{\lambda}{\pi n_{inter}},$$

where $\lambda$ is the free-space wavelength and $n_{inter}$ is the refractive index of the interlayer. Preferably, the substrate comprises the interlayer when the substrate has even small amounts of optical absorption at the wavelengths of laser diodes which may be coupled with the planar light circuit. Additionally, the interlayer advantageously may improve matching of the thermal expansion coefficient of the substrate with the waveguide layer.

According to at least one embodiment of the planar light circuit, an adhesion layer is arranged on the waveguide layer. In particular, the adhesion layer comprises or consists of $SiO_2$. Additionally or alternatively, the adhesion layer is in direct physical contact with the waveguide layer. Due to the adhesion layer, it is possible that subsequent layers, such as a cladding or a photostructurable mask, have an improved adhesion to the waveguide layer.

According to at least one embodiment of the planar light circuit, a cladding is arranged on the waveguide layer. In particular, the cladding is arranged on the adhesion layer.

According to at least one embodiment of the planar light circuit, a material of the cladding has a lower refractive index than a material of the waveguide layer. In particular, the cladding is transparent to visible electromagnetic radiation. The cladding preferably comprises a thermal expansion coefficient matching a thermal expansion coefficient of the waveguide layer.

Using a cladding material that lower in refractive index by, for example a refractive index difference of 0.2-0.5, it is possible to achieve a large refractive index contrast between the waveguide layer and its direct surrounding. This increases the number of available modes in the waveguide. Thus, the alignment of a laser diode is simplified, a use of various input coupling structures is permitted, and coherent artifacts through a reduced transverse coherence of the multi-mode output can be suppressed.

According to at least one embodiment of the planar light circuit, the cladding comprises a material selected from the following group: $SiO_2$, $Al_2O_3$, $HfO_2$, $Y_2O_3$, $MgF_2$, $CaF_2$, $YLiF_4$, oxide and fluoride glasses, transparent organic polymers. The transparent organic polymers are in particular selected from the group consisting of: polysiloxanes, silicones, poly(methyl methacrylate (PMMA), polyether ether ketone (PEEK), perfluoropolymers, such as Cytop, and mixtures thereof. The material of the cladding is, for example doped with fluorine. $SiO_2$, $Al_2O_3$, $HfO_2$, and oxide glass comprise a refractive index in a region such that a difference of the refractive index of the waveguide layer and the cladding is large. This increases advantageously the efficiency of the planar light circuit.

According to at least one embodiment of the planar light circuit, the cladding has a thickness of between and including 1 micrometer and 5 micrometers, in particular of between and including 1 micrometer and 3 micrometers. A thickness of the cladding in this range is, in particular, sufficient such that the waveguide layer does not interact with any contamination. In many cases, the evanescent fields remain confined within the cladding layers.

According to at least one embodiment of the planar light circuit, the waveguide layer has a thickness of between and including 50 nanometers and 5000 nanometers. In particular, the thickness is of between and including 50 nanometers to 500 nanometers. Such a thickness is preferred if the waveguide is used in single mode operation or only for few modes. Alternatively, the thickness is of between and including 200 nanometers and 5000 nanometers. This thickness is preferred for multi-mode waveguides.

According to at least one embodiment of the planar light circuit, a side face of the channels is perpendicular or almost perpendicular to a main extension plane of the planar light circuit. Alternatively, the side face is inclined. In particular, the side face is curved. In this way, a fillet may be formed. Such a fillet may aid applying the cladding.

According to at least one embodiment of the planar light circuit, the waveguide comprises, seen in top view, at least two branches merging together into a single branch in at least one combining region. For example, the combining region is a furcation. In particular, each branch is confined by the channels in the waveguide layer. Each branch is preferably directly adjacent to two channels. For example, the waveguide comprises three branches merging together into a single branch. To merge the three branches into a single branch, the waveguide preferably comprises one or two combining regions.

According to at least one embodiment of the planar light circuit, at least one of the branches, seen in top view, has a sigmoidal shape or the shape of a tangent function. Additionally or alternatively, one of the branches is linear, seen in top view. In particular, the branches and the combining regions are parametrized through Bezier functions.

Furthermore, a radiation emitting device is specified. In particular, a planar light circuit as described herein is used in the radiation emitting device. Thus, all features and embodiments described in combination with the planar light circuit also apply to the radiation emitting device and vice versa.

According to at least one embodiment of the radiation emitting device, the planar light circuit is used as a beam combiner. In particular, an output of multiple laser diodes is combined in the planar light circuit, for example into a single emission point. The combined output can be used for projection, laser processing, AR/VR applications, and related applications. Preferably, the multiple laser diodes are of the same or different color. In other words, it is possible to combine the output of red, green, and blue laser diodes or of multiple laser diodes of one of these colors. For example, the planar light circuit is used or configured to combine red, green and blue electromagnetic radiation into a single emission point.

According to at least one embodiment of the radiation emitting device, the planar light circuit is used as a beam splitter. That is, an output of a single laser diode is split, for example to provide several coherent or at least partially coherent outputs. The coherent or at least partially coherent outputs can be used in various applications, such as interferometric applications.

According to at least one embodiment, the radiation emitting device comprises at least one laser diode and a planar light circuit. The planar light circuit is arranged subsequently to the at least one laser diode or vice versa.

Advantageous embodiments and developments of the method for producing a planar light circuit, the planar light circuit and the radiation emitting device will become apparent from the exemplary embodiments described below in conjunction with the figures.

BRIEF DESCRIPTION OF THE DRAWINGS

In the figures:

FIG. 4 shows a plot of a N/Si ratio versus a refractive index of a waveguide layer comprising $SiN_x$.

DETAILED DESCRIPTION

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

Figure 1A:
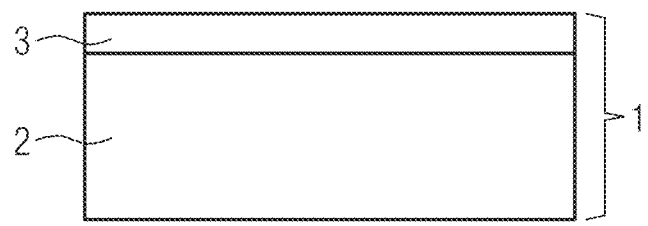
FIGS. 1A to 1H show schematic sectional view of stages of a method for producing a planar light circuit according to an exemplary embodiment.

As shown in FIG. 1A, during a method for producing a planar light circuit according to an exemplary embodiment a substrate 1 is provided. The substrate 1 is free of light producing regions. Presently the substrate 1 comprises a substrate layer 2 and an interlayer 3. The substrate layer 2 comprises or consists of silicon, whereas the interlayer 3 comprises or consists of wet thermal $SiO_2$. The interlayer 3 has a thickness of about 2 micrometer. Alternatively, a substrate 1 comprising or consisting of fused silica is provided. The substrate 1 is provided in the form of a wafer.

Figure 1B:
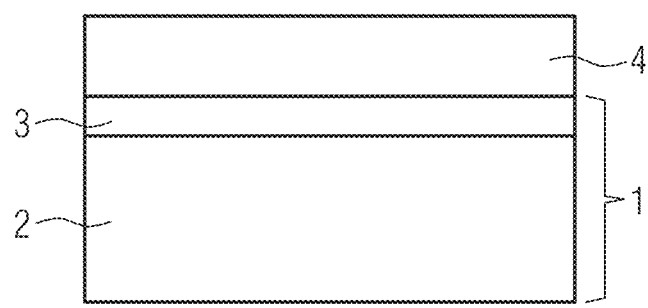

A waveguide layer 4 is deposited on the substrate 1 as shown in FIG. 1B. Before the deposition of the waveguide layer 4, a surface of the substrate 1, in particular a surface of the interlayer 3 is cleaned using a plasma clean with $N_2O$ at 200 Watts for about 5 min. The waveguide layer 4 presently comprises or consists of Si-poor $SiN_x$. The waveguide layer 4 is directly applied on the substrate 1, in particular directly on the interlayer 3 of the substrate 1. The waveguide layer 4 is deposited by PECVD using the parameters described in table 1.

TABLE 1

Parameters for PECVD deposition of Si-poor $SiN_x$.

| Parameter | Value |
| --- | --- |
| Table Temperature | 300° C. |
| Chamber Pressure | 650 mTorr |
| $N_2$ | 490 sccm |

TABLE 1-continued

Parameters for PECVD deposition of Si-poor $SiN_x$.

| Parameter | Value |
| --- | --- |
| $NH_3$ | 40 sccm |
| 5% $SiH_4$ in Ar | 160 sccm |
| Low frequency electrode impedance | 882 Ohms |
| Low frequency power | 20 W |
| Low frequency period | 7s |
| Low frequency pulsed? | yes |
| High frequency power | 20 W |
| High frequency period | 13 s |
| High frequency pulsed? | No |
| Estimated deposition rate | 13.703 nm/min |

The waveguide layer 4 presently has a thickness of about 3 micrometer. Table 2 shows extinction coefficients for the waveguide layer 4 depending on the wavelength. The extinction coefficient here and in the following is to be understood as the parameter b in the equation $I(x)=I_0*exp(-b*x)$ where I is the intensity depending on a distance x along a waveguide.

TABLE 2

Extinction coefficients of a waveguide layer 4 with Si-poor $SiN_x$ and a thickness of about 3 micrometer.

| Wavelength (nm) | Extinction coefficient (1/mm) |
| --- | --- |
| 405 (purple) | 0.521 |
| 450 (blue) | 0.105 |
| 532 (green) | 0.119 |
| 650 (red) | 0.030 |

Figure 1C:
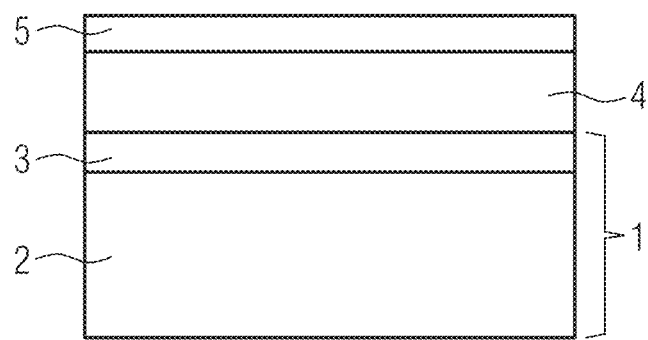

After the deposition of the waveguide layer 4, an adhesion layer 5 is deposited on the waveguide layer 4, as shown in FIG. 1C. The adhesion layer 5 presently comprises or consists of $SiO_2$. A thickness of the adhesion layer 5 is about 10 nanometer. The adhesion layer 5 is deposited by PECVD using the parameters listed in table 3.

TABLE 3

Parameters for PECVD deposition of an adhesion layer 4 comprising $SiO_2$.

| Parameter | Value |
| --- | --- |
| Table Temperature | 300° C. |
| Chamber Pressure | 1000 mTorr |
| $N_2O$ | 710 sccm |
| 5% $SiH_4$ in Ar | 150 sccm |
| High frequency power | 20 W |
| Approximate deposition rate | 60 nm/min |

Figure 1D:
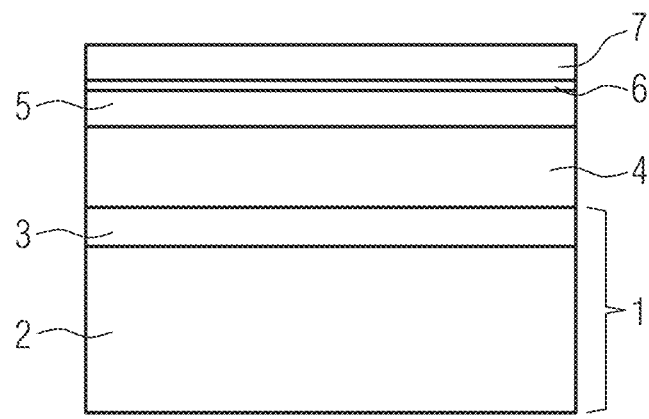

In a further step, as shown in FIG. 1D, an adhesion promoter 6 is applied on the waveguide layer 4. The adhesion promoter 6 is directly applied on the adhesion layer 5. Presently, the adhesion promoter 6 is hexamethyldisilazane (HMDS). The HMDS is applied on the waveguide layer 4 using spin coating. As absorption of moisture may affect an adhesion of the HMDS, an oxygen plasma clean may be used if the waveguide layer 4 was sitting for a significant amount of time. The parameters shown in table 4 were used during spin coating of the HMDS.

TABLE 4

HMDS spin coating parameters.

| Step | Velocity (rpm) | Ramp (rpm/s) | Time (s) |
|---|---|---|---|
| 1 | 500 | 200 | 5 |
| 2 | 5000 | 750 | 30 |
| 3 | 0 | 500 | 0 |

After applying the adhesion promoter 6, the waveguide layer 4 is heated for 3 min to 110° C. Then, a photostructurable mask 7 is applied on the adhesion promoter 6 by spin coating using the parameters shown in table 5.

TABLE 5

Photostructurable mask 7 spin coating parameters.

| Step | Velocity (rpm) | Ramp (rpm/s) | Time (s) |
|---|---|---|---|
| 1 | 500 | 200 | 5 |
| 2 | 6000 | 750 | 60 |
| 3 | 0 | 500 | 0 |

The photostructurable mask 7 is heated for 3 min to 110° C. Presently, the photostructurable mask 7 has a thickness of about 5 micrometer.

Before photostructuring, the photostructurable mask 7 is allowed to rehydrate. For this the photostructurable mask 7 was left in air for about 30 min.

Figure 1E:
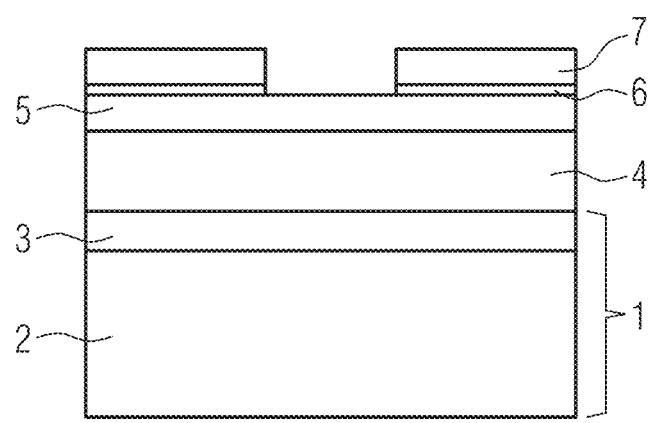

As shown in FIG. 1E, the photostructurable mask 7 is photostructured such that the photostructurable mask 7 is removed in regions. For photostructuring, the photostructurable mask 7 is exposed to electromagnetic radiation in the regions. Presently, UV radiation is used. 15 Detailed parameters for the exposure to electromagnetic radiation are described in table 6.

TABLE 6

Parameters for exposure to electromagnetic radiation.

| Parameter | Value |
|---|---|
| Exposure dose | 6.1 s @ 24.9 mW/cm2 |
| Wavelength | 365 nm |
| Alignment Gap | 6 µm |
| Expose Type | Hard |
| Hard contact wait time | 10 s |
| WEC Type | Contact |
| WEC Offset | Off |

WEC is the abbreviation for wedge error compensation. The WEC type 'contact' means that a structuring mask is in direct contact with the photostructurable mask 7 during exposure to electromagnetic radiation. The exposure type 'hard' brings a structuring mask in direct contact with the photostructurable mask 7. The hard contact wait time represents a delay during which the structuring mask will be in contact with the photostructurable mask 7 before exposure to the electromagnetic radiation.

After exposure to electromagnetic radiation, the photostructurable mask 7 is developed using a developer. In this way, the photostructurable mask 7 is removed in the regions. Presently, a potassium-based buffered developer mixed with water is used as developer. The ratio of water to developer is 1:4. A development time was about 90 s.

Figure 1F:
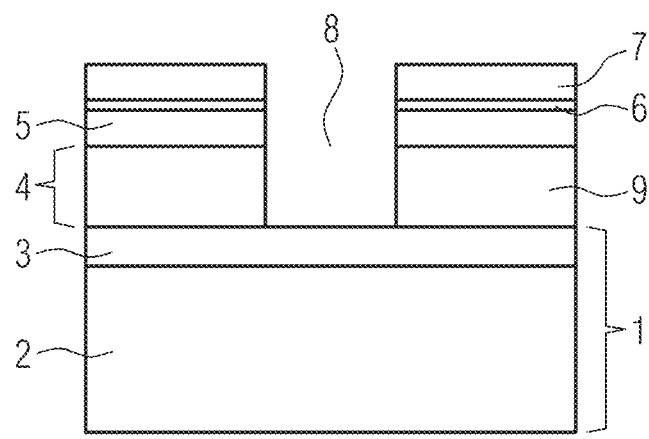

In a next step of the method for producing a planar light circuit, the waveguide layer 4 is etched in the regions which are free of the photostructurable mask 7 (FIG. 1F). In this way, channels 8 are produced in the waveguide layer 4. The channels 8 confine waveguides 9. A channel 8 is directly adjacent to at least one waveguide 9. The channels 8 reach through the waveguide layer 4. That is the waveguide layer 4 is completely removed in the regions which are free of the photostructurable mask 7 after photostructuring. A bottom face of the channels 8 is formed by the substrate 1, in particular the interlayer 3 of the substrate 1. The waveguide layer 4 is etched by inductively coupled plasma (ICP) etching using various fluorine and carbon based gasses.

Before the etching of the waveguide layer 4, a reaction chamber for the inductively coupled plasma etching is cleaned. To clean the reaction chamber the parameters described in table 7 are set. A clean time is for example about 10 min.

TABLE 7

Parameters for reaction chamber cleaning.

| Parameter | Value |
|---|---|
| ICP Power | 1500 W |
| Electrode | 150 W |
| Chuck Temperature Setpoint | 15° C. |
| Backing helium pressure | 0 Torr |
| Chamber Pressure | 20 mTorr |
| $O_2$ | 40 sccm |
| $SF_6$ | 10 sccm |

After cleaning of the reaction chamber, the waveguide layer 4 is etched using the parameters listed in table 8. An etching time is about 12.5 minutes.

TABLE 8

Parameters for etching the waveguide layer 4.

| Parameter | Value |
|---|---|
| ICP Power | 1250 W |
| Electrode | 15 W |
| Chuck Temperature Setpoint | 15° C. |
| Backing helium pressure | 5 Torr |
| Chamber Pressure | 6 mTorr |
| $SF_6$ | 6 sccm |
| $CHF_3$ | 26 sccm |

During etching of the waveguide layer 4, the adhesive layer 4 is also removed in the regions free of the photostructurable mask 7.

Figure 1G:
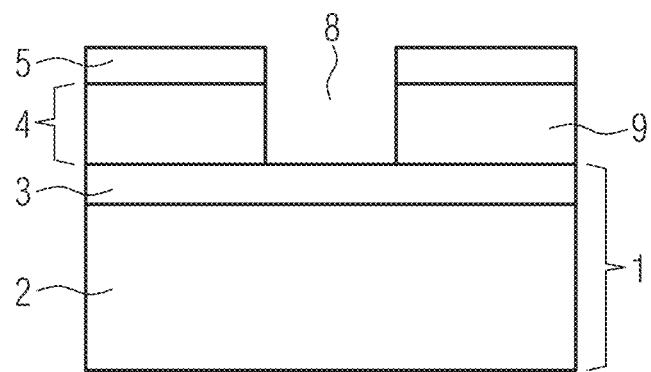

As shown in FIG. 1G, the photostructurable mask 7 is removed after the waveguide layer 4 is etched such that channels 8 are produced in the waveguide layer 4. The photostructurable mask 7 is presently removed using a mixture of $H_2SO_4$ and $H_2O_2$ prepared from four parts 70% $H_2SO_4$ and one part 30% aqueous $H_2O_2$. This mixture is also called piranha solution. The photostructurable mask 7 is removed by soaking in the mixture for less than 10 min. Afterwards, the waveguide layer 4 is rinsed with deionized water.

Figure 1H:
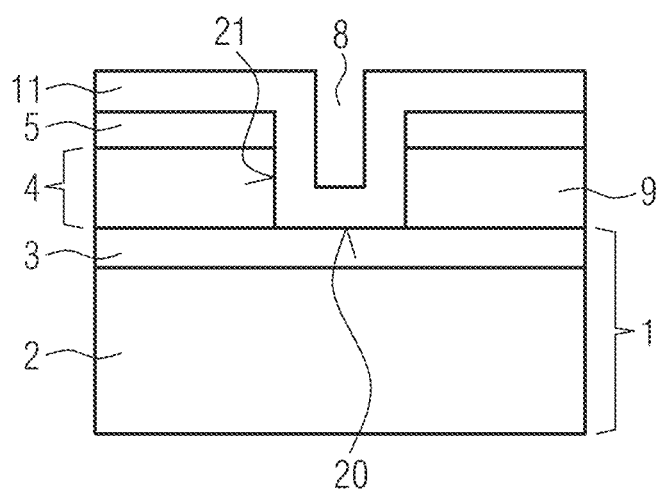

As shown in FIG. 1H, a cladding 11 is applied on the waveguide layer 4 using PECVD. The cladding 11 reduces scattering loss and insertion loss. The cladding 11 has a thickness of about 2 micrometer. The parameters described in table 9 are used during PECVD.

TABLE 9

Parameters for applying the cladding 11 by PECVD.

| Parameter | Value |
| --- | --- |
| Table Temperature | 400° C. |
| Chamber Pressure | 1500 mTorr |
| N$_2$O | 480 sccm |
| CF$_4$ | 800 sccm |
| 5% SiH$_4$ in Ar | 160 sccm |
| High frequency power | 20 W |
| High frequency pulsed | No |
| Deposition time | 20 min |

The cladding 11 covers the waveguide layer 4. In particular, the cladding 11 is in direct physical contact with the adhesion layer 5. The channels 8 are partially filled with the cladding 8. Side faces 21 of the channels 8 and a bottom face 20 of the channels 8 formed by the substrate 1 are covered with the cladding 11.

To produce a planar light circuit 10, the wafer is singulated. For singulation, cleaving locations 12 are scored into the wafer. The planar light circuit 10 is obtained by cleaving at the cleaving locations 12, 13, 14 using pliers.

Figure 2:
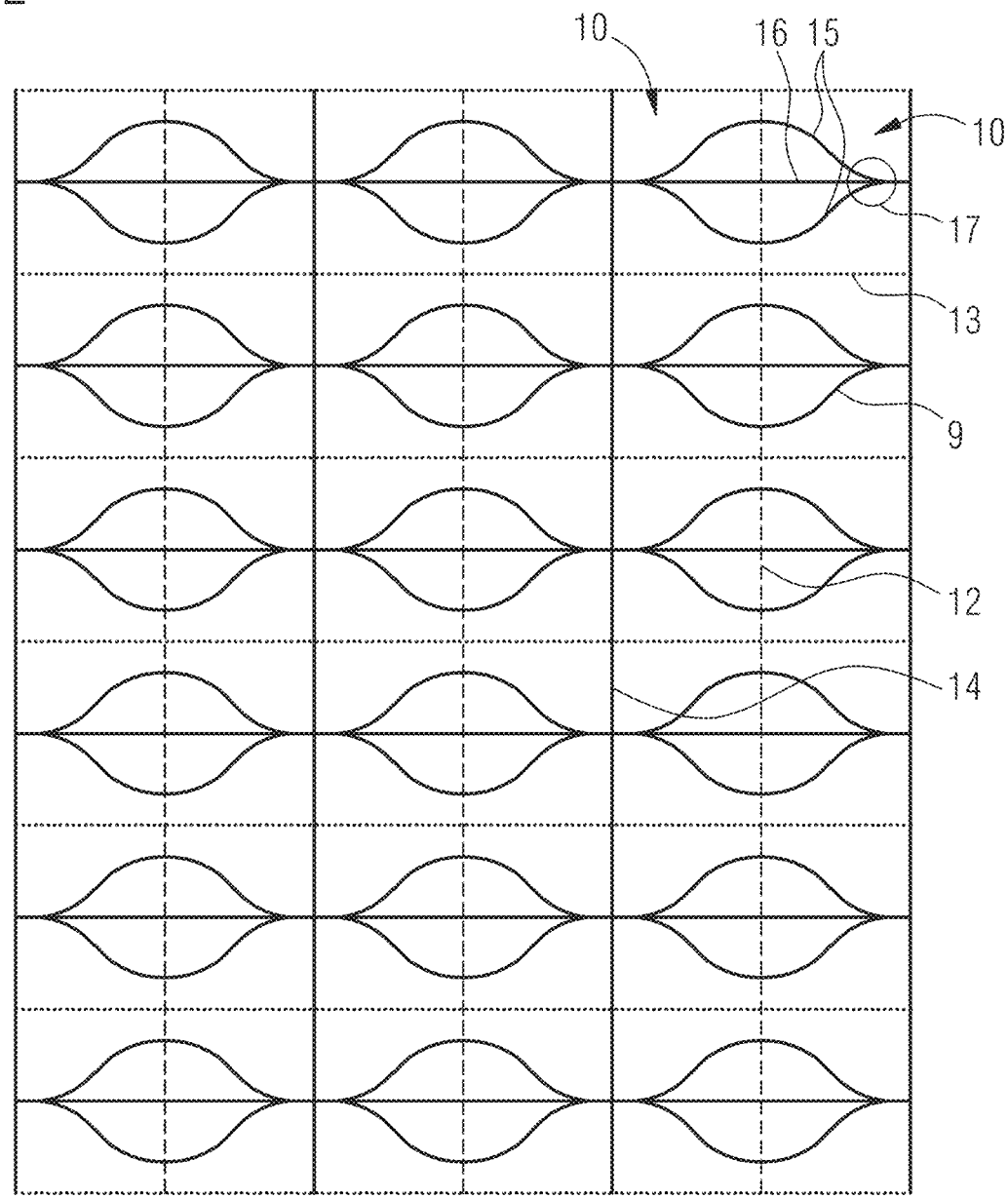
FIG. 2 shows a schematic top view of a stage of a method for producing a planar light circuit according to an exemplary embodiment.

An order of cleaving is shown in FIG. 2. The order is cleaving at the first cleaving locations 12 (hashed lines), then at the second cleaving locations 13 (dotted lines), and then at the third cleaving locations 14 (solid lines).

Additionally, the wafer is in particular diced, lapped, and polished. However, care must be taken to minimize chipping of facets of the waveguide.

The planar light circuits 10 shown in FIG. 2 each comprise a waveguide 9 comprising three branches 15, 16. Presently, the three branches 15, 16 merge together into a single branch 18 in a combining region 17. The waveguide 9 comprises a symmetry axis running parallel to the middle branch 16, seen in the top view of FIG. 2. The branches 15 comprise a curved shape.

Figure 3A:
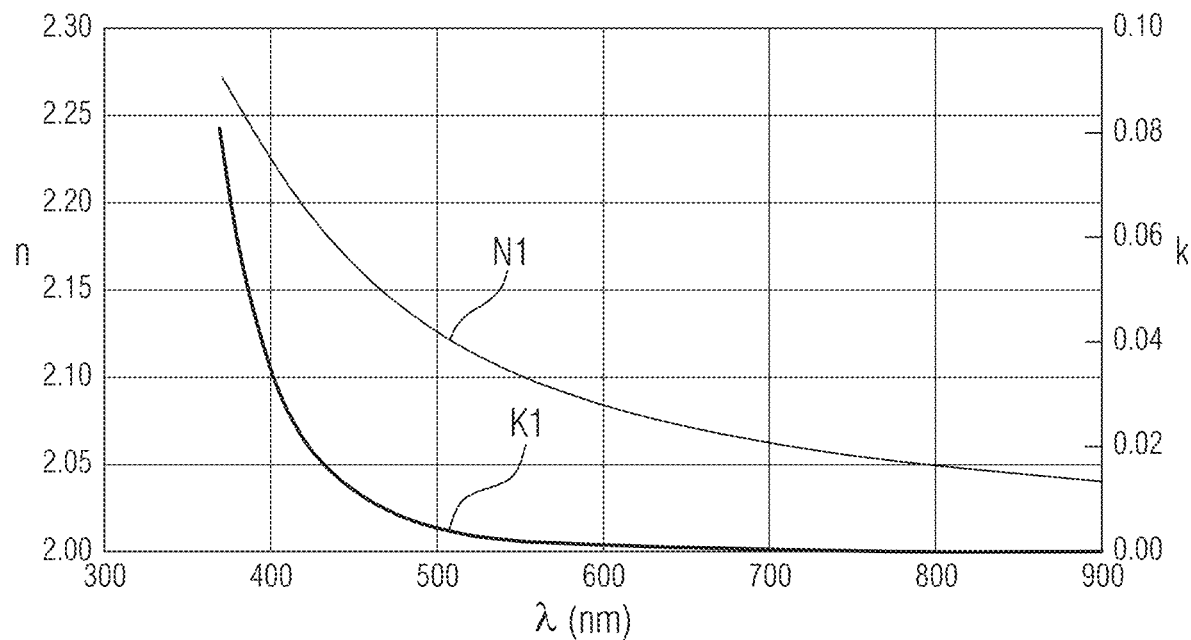
FIGS. 3A and 3B show results of ellipsometry measurements of waveguide layers.
Figure 3B:
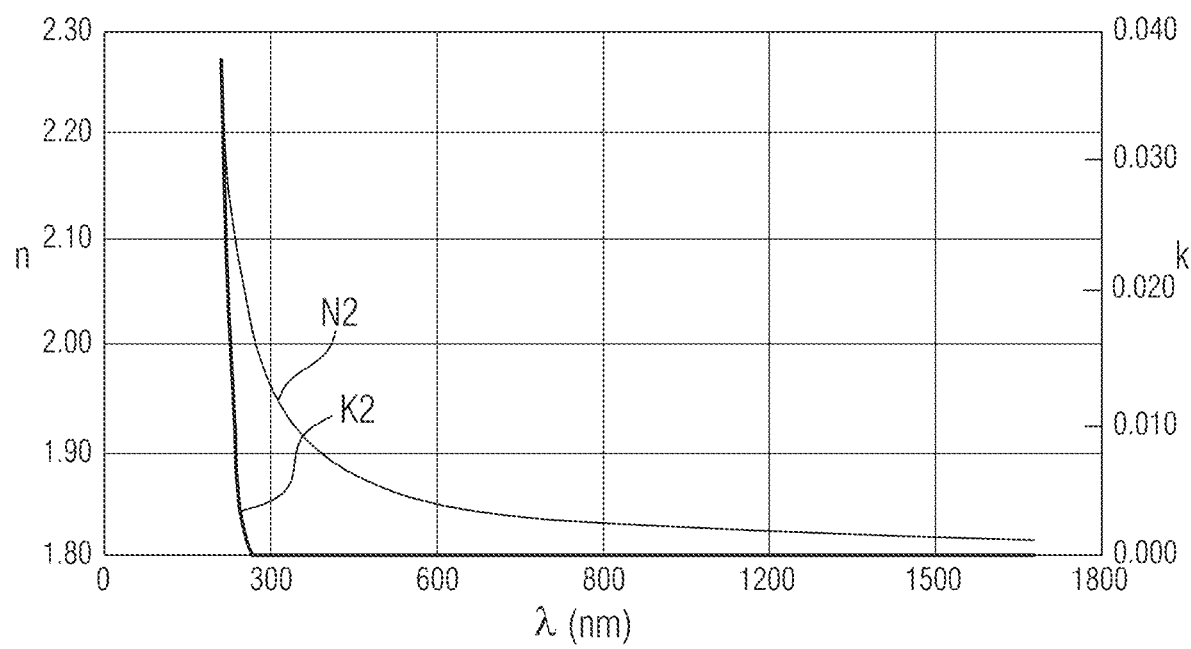

FIGS. 3A and 3B each show results of ellipsometry measurements of waveguide layers 4. The waveguide layer 4 comprising compressively stressed Si-poor SiN$_x$ showing the measurements of FIG. 3B was produced using the parameters shown in table 1. The waveguide layer 4 comprising close to stoichiometric SiN$_x$ showing the measurements of FIG. 3A was produced using different parameters.

FIGS. 3A and 3B each show the refractive index n and the extinction coefficient k depending from the wavelength λ. The waveguide layer 4 comprising compressively stress Si-poor SiN$_x$ comprises a refractive index curve N2 and an extinction coefficient curve K2. The waveguide layer 4 comprising close to stoichiometric SiN$_x$ comprises a refractive index curve N1 and an extinction coefficient curve K1. The curves N2 and K2 both show a steeper slope than the curves N1 and K1.

Furthermore, the refractive index of the waveguide layer 4 comprising compressively stress Si-poor SiN$_x$ is lower than that of the waveguide layer 4 comprising close to stoichiometric SiN$_x$. The extinction coefficient of the waveguide layer 4 comprising compressively stress Si-poor SiN$_x$ is nearly unresolvable compared to the extinction coefficient of the waveguide layer 4 comprising close to stoichiometric SiN$_x$.

FIG. 4 shows a plot of an estimated N/Si ratio versus a measured refractive index of a waveguide layer 4 comprising SiN$_x$ at a wavelength of 900 nanometer. The N/Si ratio may be estimated from the following equation:

$$R \equiv \left(\frac{N}{Si}\right)_{ratio} = \frac{4}{3}\left(\frac{n_{Si} - n_{waveguide\,layer}}{n_{waveguide\,layer} + n_{Si} - 2n_{Si3N4}}\right).$$

Here, $n_{Si}$ is the refractive index of a waveguide layer 4 consisting of Si, $n_{Si3N4}$ is the refractive index of a waveguide layer 4 consisting of stoichiometric SiN$_x$, that is Si$_3$N$_4$, and $n_{waveguide\,layer}$ is the refractive index of waveguide layer 4 consisting of non-stoichiometric SiN$_x$. Presently, $n_{Si}$=3.610 and $n_{Si3N3}$=2.018.

Using the plot shown in FIG. 4, the N/Si ratio of the waveguide layer 4 leading to the graphs of FIG. 3A is determined to be about 0.94. That is this waveguide layer 4 comprises a SiN$_x$ with a close to stoichiometric composition. The waveguide layer 4 leading to the graphs of FIG. 3B comprises a N/Si of about 1.29. That is the waveguide layer 4 of FIG. 3B is Si-poor.

Figure 5:
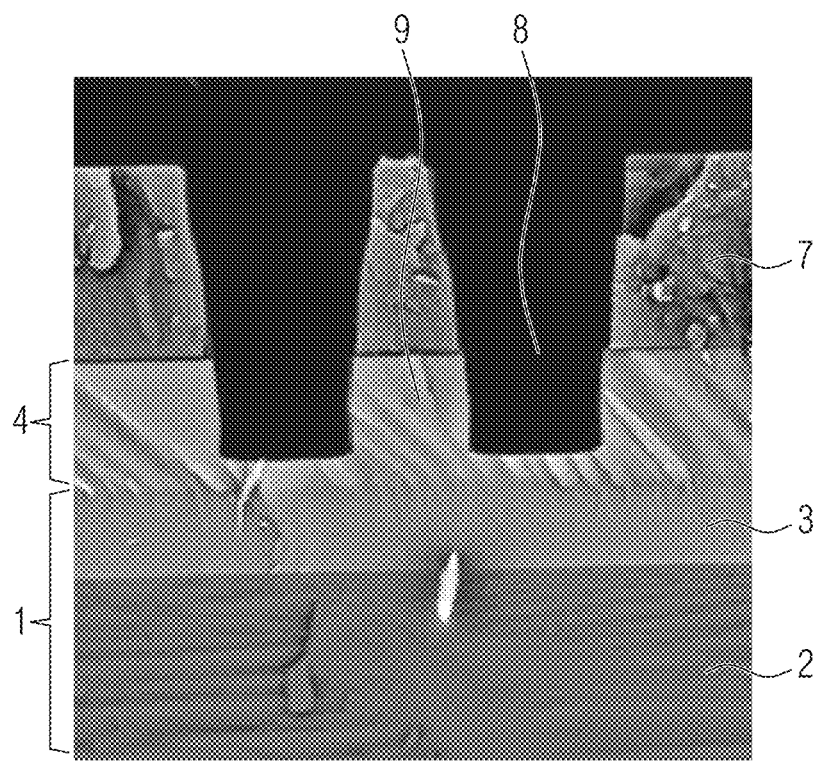
FIG. 5 shows a scanning electron microscopy (SEM) image of a cross-section of a stage of a method for producing a planar light circuit.

The SEM image shown in FIG. 5 is an intermediate stage during etching of a waveguide layer 4. The waveguide layer 4 is deposited on a substrate 1 comprising a substrate layer 2 with silicon and an interlayer 3 with SiO$_2$. The waveguide layer 4 comprises Si-poor SiN$_x$. A photostructurable layer 7 is arranged on the waveguide layer 4. Channels 8 reach into the waveguide layer 4. That is, a bottom face of the channels 8 is formed in the waveguide layer 4. In other words, the waveguide layer 4 shown in FIG. 4 is not completely etched through. Two channels 8 confine a waveguide 9.

Figure 6:
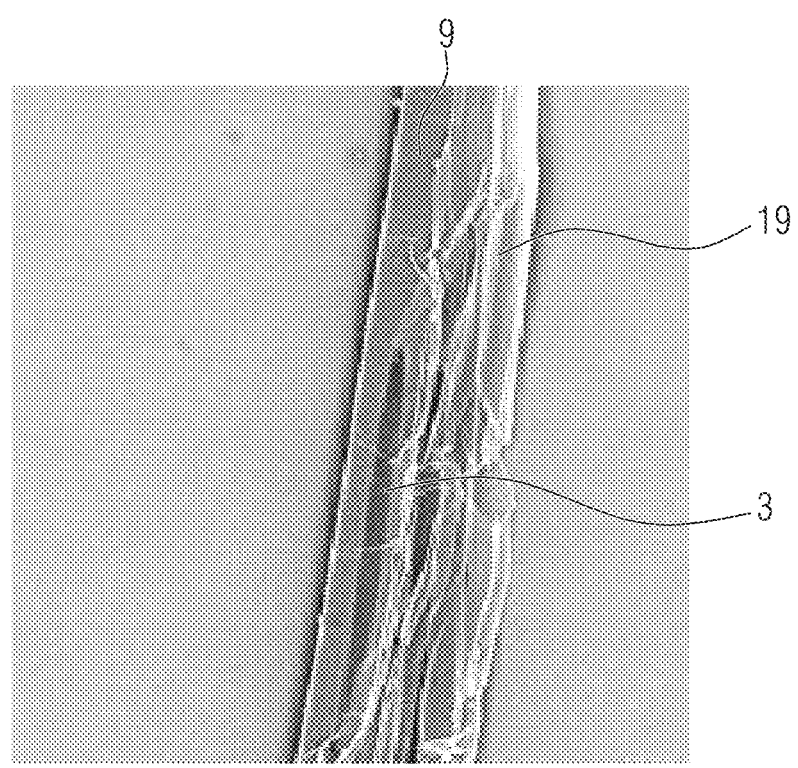
FIG. 6 shows a SEM image of a top view of a stage of a method for producing a planar light circuit.

FIG. 6 shows a SEM image of a top view of a stage of a method for producing a planar light circuit 10. Presently, the photostructurable mask 7 has not been removed yet. Due to the etching of the waveguide layer 4, the photostructurable mask 7 is polymerized on its surface. This polymerized residue 19 of the photostructurable mask 7 is hard to remove by solvents such as acetone.

Figure 7:
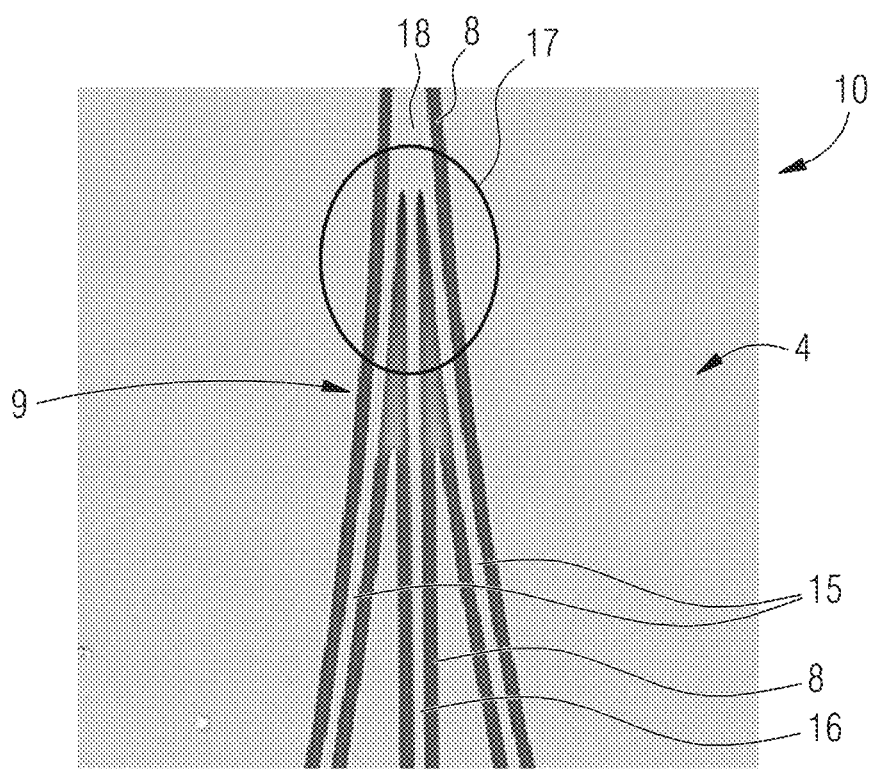
FIG. 7 shows a SEM image of a top view of a planar light circuit according to an exemplary embodiment.

FIG. 7 shows a SEM image of a top view of a planar light circuit 10 according to an exemplary embodiment. The planar light circuit 10 comprises a waveguide layer 4 with channels 8. The channels 8 reach through the waveguide layer 4 and confine a waveguide 9. The waveguide 9 presently comprises three branches 15, 16 which merge together into a single branch 18 in a combining region 17. Each branch 15, 16 is confined by channels 8.

Figure 8:
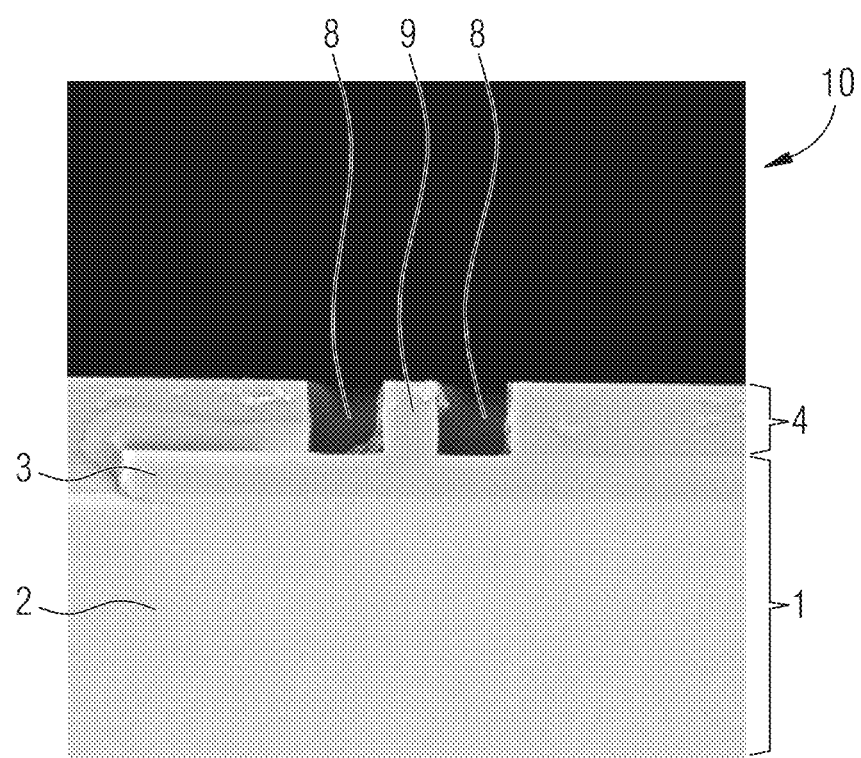
FIGS. 8, 9, and 10A to 10C each show a SEM image of cross-sections of a planar light circuit according to exemplary embodiments.

In FIG. 8, a SEM image of a cross section of a planar light circuit 10 according to an exemplary embodiment is shown. The planar light circuit 10 comprises a substrate 1 having a substrate layer 2 and an interlayer 3. The substrate layer 2 comprises or consists of silicon, whereas the interlayer 3 comprises or consists of SiO$_2$. A waveguide layer 4 is arranged in direct contact physical contact with the interlayer 3. Presently, the waveguide layer 4 comprises Si-poor SiN$_x$. Channels 8 confine a waveguide 9 in the waveguide layer 4. The waveguide 9 is formed from the same material as the surrounding waveguide layer 4. In the cross-section, the waveguide 9 comprises a rectangular shape. Two faces of the waveguide 9 are directly adjacent to the channels 8. Another face of the waveguide 9 is directly adjacent to the interlayer 3.

Figure 9:
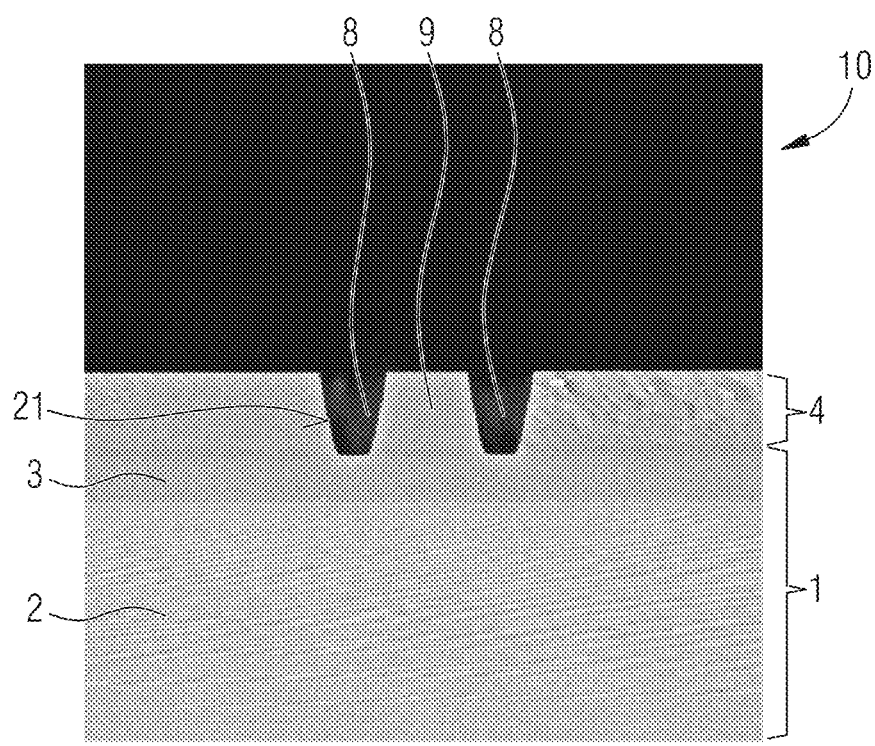

The structure of the planar light circuit 10 shown in FIG. 9 is similar to the one shown in FIG. 8. However, the channels 8 and thus the waveguide 9 comprise a different shape, especially seen in cross-section. Presently, the side faces 21 of the channels 8 are not perpendicular to a main extension plane of the planar light circuit 10. Here, the side face 21 are slightly inclined. Thus, the channels 8 approximately comprise, seen in cross-section, the shape of a trapezoid.

The planar light circuit 10 shown as cross-section in figure comprises a cladding 11 on the waveguide layer 4. Seen in top view, the cladding 11 preferably completely covers the waveguide layer 4. The channels 8 are partially filled by the cladding 11. In particular, the planar light circuit 10 shown in FIG. 10A has been produced by the method described in combination with FIGS. 1A to 1H.

Figure 10A:
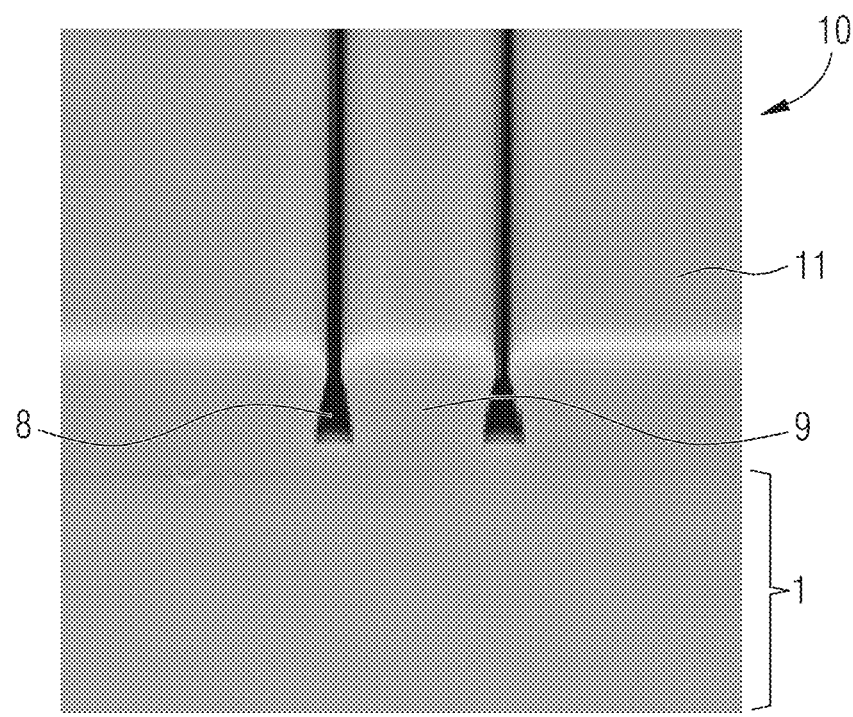
Figure 10B:
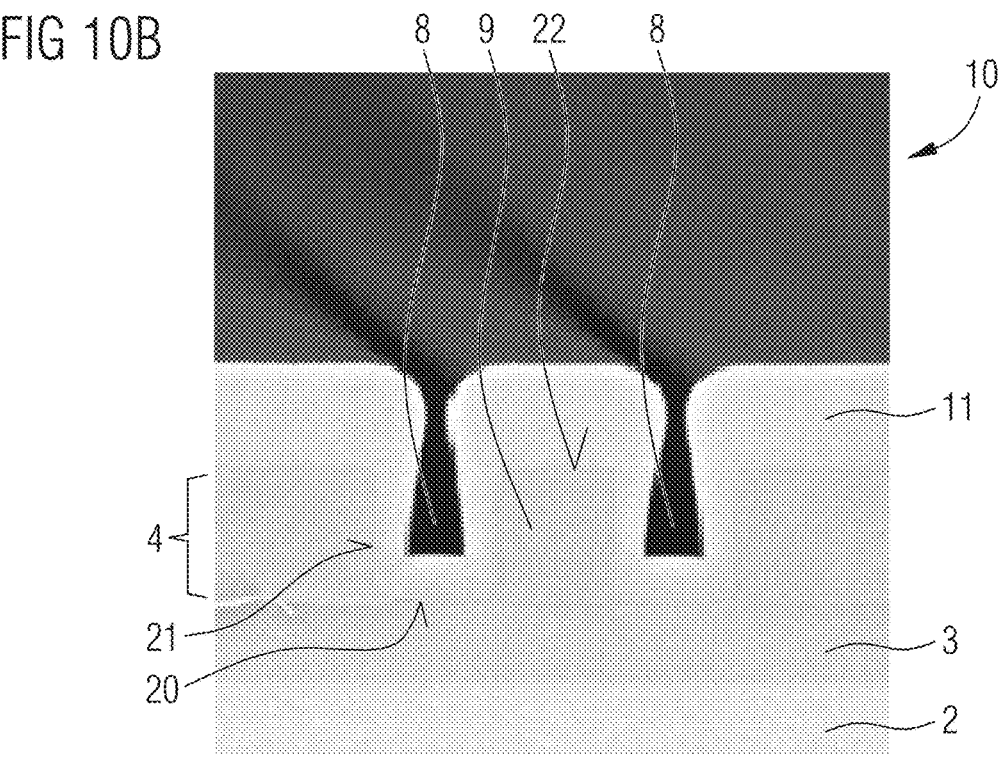

The planar light circuit 10 shown in FIG. 10B is, in particular, the same as the one shown in FIG. 10A. The waveguide layer 4 is arranged on a substrate 1 comprising a substrate layer 2 and an interlayer 3. The waveguide layer 4 is in direct physical contact with the interlayer 3. The substrate 1 comprises presently a silicon substrate layer 2 and a $SiO_2$ interlayer 3. The waveguide layer 4 comprises or consists of Si-poor $SiN_x$.

Channels 8 run through the waveguide layer 4 such that a waveguide 9 is formed in the waveguide layer 4. Two channels 8 confine the waveguide 9. Thus, seen in cross-section, the channels 8 in the waveguide layer 4 and the waveguide 9 comprise a rectangular shape.

A cladding 11 is arranged on the waveguide layer 4. The cladding 11 partially fills the channels 8 in the waveguide layer 4. Presently, the cladding 11 comprises or consists of fluorine doped $SiO_2$. Seen in the cross-section, the waveguide 9 surrounded by the cladding 11 has approximately the shape of a trapezoid with two rounded corners. This shape may be compared to the shape of a toast.

A bottom face and side faces of the channels 8 are covered by the cladding 11. A thickness of the cladding 11 is smaller at the bottom face 20 of the channels 8 than a top face 22 of the waveguide 9 facing away from the substrate 1. The thickness of the cladding 11 on the side faces 21 of the channels 8 decreases in a direction towards the bottom face 20 of the channels 8. In other words, the cladding 11 comprises an undercut in the region of the channels 8. A distance of the cladding 11 outside of the channels 8 in the waveguide layer 4 is smaller than inside the channels 8.

Figure 10C:
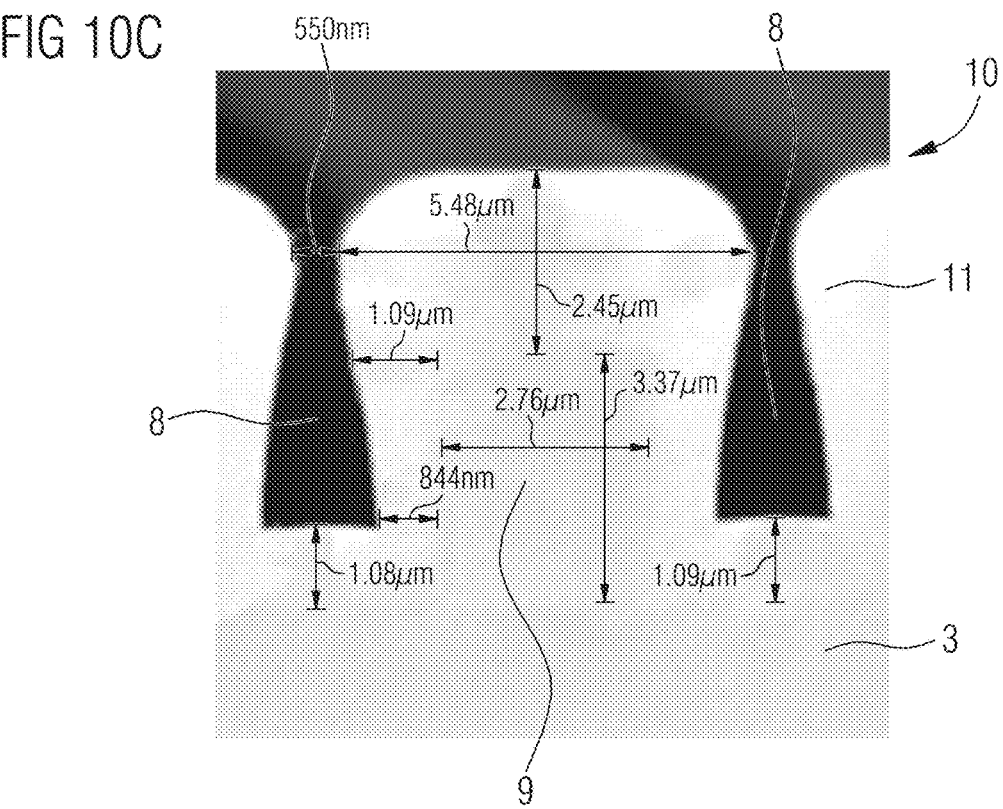

FIG. 10C shows the planar light circuit 10 of FIG. 10B enlarged. Furthermore, thicknesses of the cladding 11 and the waveguide 9 are shown. Seen in the cross-section of FIG. 10C, the waveguide 9 comprises a greater height than width. The height of the waveguide 9 is in particular perpendicular to a main extension plane of the planar light circuit 10, whereas the width is parallel to the main extension plane of the planar light circuit 10. Presently, the waveguide 9 comprises a height of about 3.37 micrometers and a width of about 2.76 micrometer.

At the bottom face 20 of the channels 8 the cladding 11 comprises a lower thickness than on the top face 22 of the waveguide 9. Presently, the thickness of the cladding 11 at the bottom face 20 is about 1.08 micrometers and the top face 22 of the waveguide 9 about 2.45 micrometers. The thickness of the cladding 11 on the side face 21 is about 844 nanometers in the region of the bottom face 20 of the channels 8. The thickness on the side face 21 increases to reach about 1.09 micrometers in the region of the top face 22 of the waveguide 9. The cladding 11 surrounding the waveguide 9 has a maximum width of about 5.48 micrometers in a region above the top face 22 of the waveguide 9. A distance between the cladding 11 on the waveguide 9 and the cladding 11 on the surrounding waveguide layer 4 is about 550 nanometers at the narrowest point.

Figure 11:
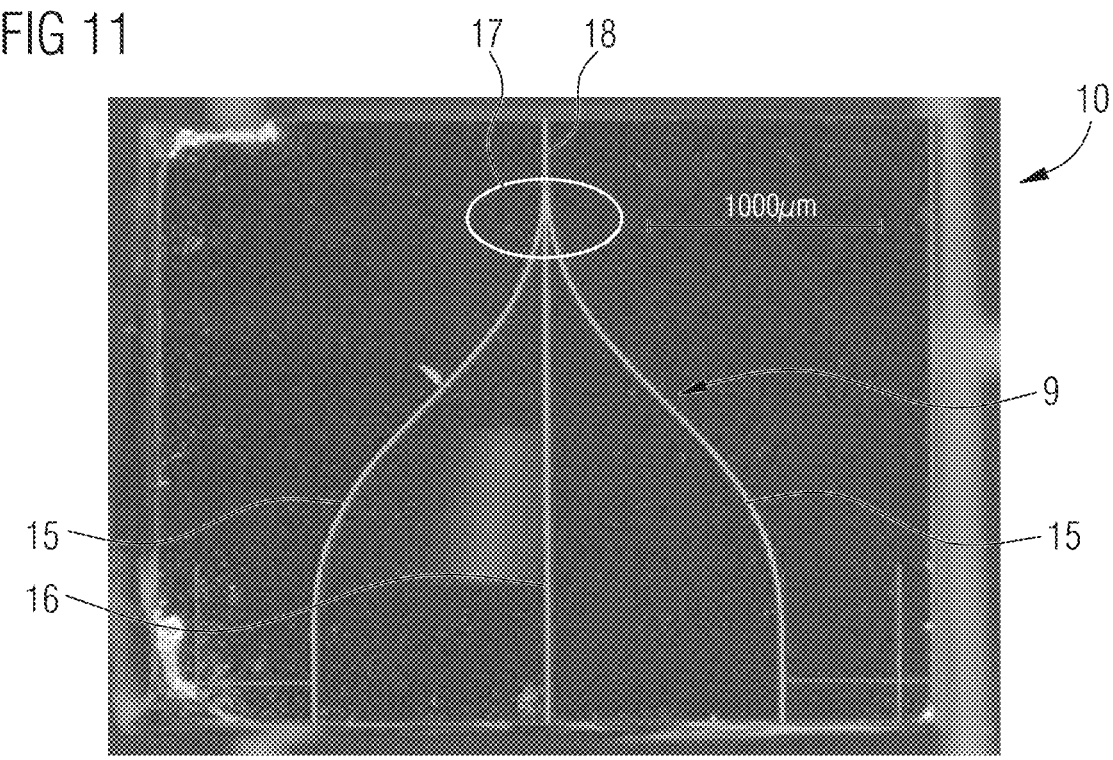
FIG. 11 shows an image of a top view of a planar light circuit according to an exemplary embodiment.

FIG. 11 shows an image of a top view of a planar light circuit 10 according to an exemplary embodiment. The planar light circuit 10 comprises a waveguide 9 having three branches 15, 16. The three branches 15, 16 merge together into a single branch 18 in a combining region 17. The waveguide 9 comprises a symmetry axis which is parallel to the middle branch 16. Presently, the symmetry axis is an axis of reflection. The middle branch 16 changes into the single branch 18 without a bend. That is, the middle branch 16 and the single branch 18 are arranged on the same imaginary line. In other words, a starting point of the middle branch 16 and an end point and/or a starting point of the single branch 18 are on the same line.

The branches 15 comprise a curved shape in top view. For example, the branches 15 comprise a Beziér, sigmoidal shape or the shape of a tangent function. A course of the branches 15, seen in top view, comprises at least one inflection point. A starting point of the two branches 15 is equally distanced to a starting point of the middle branch 16.

An efficiency of the planar light circuit 10 described herein was measured using both lens coupled laser diodes and butt-coupled laser diodes. The results are shown in table 10. During measurements a high NA microscope objective (NA=0.85) was used.

TABLE 10

Efficiencies of a planar light circuit 10.

| Wavelength (nm) | Fast axis | Polarization | efficiency left branch | middle branch | right branch |
|---|---|---|---|---|---|
| 450 | Horizontal | Vertical | 0.347 | 0.371 | 0.341 |
| 450 | Vertical | Horizontal | 0.489 | 0.485 | 0.493 |
| 532 | Round | Vertical | 0.424 | 0.460 | 0.368 |
| 532 | Round | Horizontal | 0.350 | 0.377 | 0.344 |
| 650 | Horizontal | Vertical | 0.342 | 0.414 | 0.384 |
| 650 | Vertical | Horizontal | 0.455 | 0.483 | 0.558 |
| 450 | Vertical | Horizontal | 0.302 | 0.424 | 0.517 |
| 450 | Vertical | Horizontal | 0.499 | 0.485 | 0.444 |
| 450 | Vertical | Horizontal | 0.483 | 0.424 | 0.405 |

For 450 nanometer and 650 nanometer laser diodes, the fast axis is perpendicular to the polarization. In case of the 532 nanometer laser diode which is believed to be second harmonic converted, the beam is round, so there is no distinction of beam asymmetry with respect to polarization. The waveguides 9 in particular are taller than wide and have more cladding 11 in the vertical direction. The vertical direction is perpendicular to a main extension plane of the planar light circuit. This suggests that aligning the fast axis with the vertical direction should yield higher efficiency due to greater availability of modes and better confinement. This agrees with the experimental results for the 450 nanometer and 650 nanometer laser diodes. The 532 nanometer laser diode does not have this spatial asymmetry. In this case, the vertical polarized light seems to have increased efficiency.

Using a green edge emitting laser diode, light was coupled into the middle branch 16 of a planar light circuit 10 and an efficiency of 0.45 was achieved.

Figure 12:
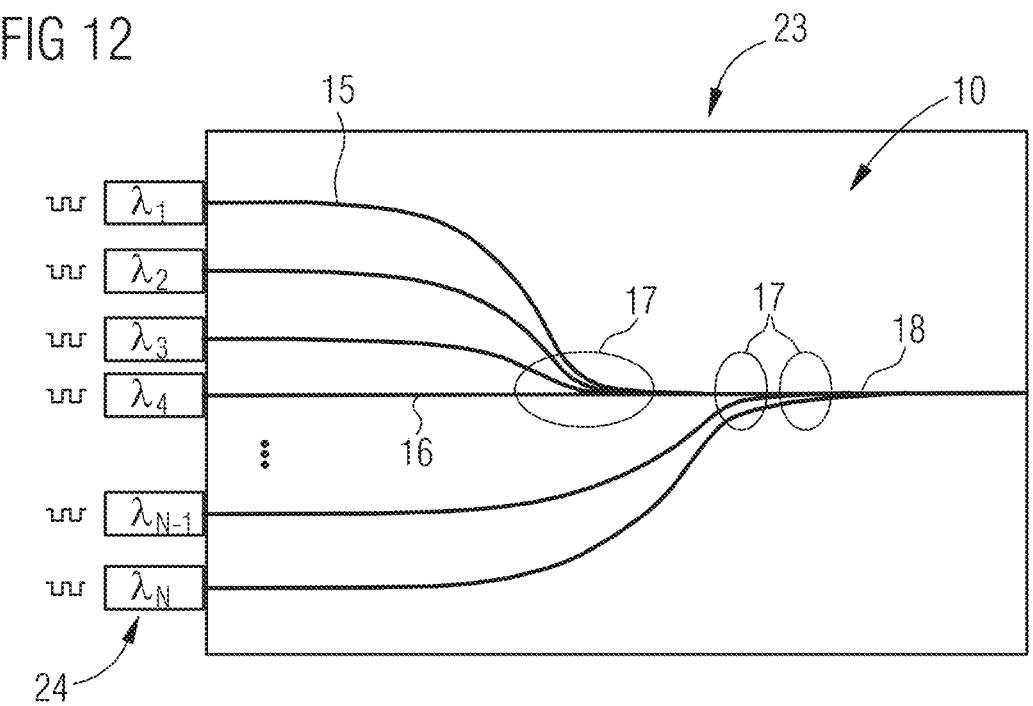
FIG. 12 shows a schematic top view of a radiation emitting device according to an exemplary embodiment.

FIG. 12 shows a radiation emitting device 23 according to an exemplary embodiment. Presently, the radiation emitting device 23 comprises N laser diodes 24. The laser diodes 24 emit electromagnetic radiation of different wavelengths. The laser diodes 24 may be run continuous wave (CW), modulated, or pulsed (including alternating pulse patterns). The radiation emitting device 23 further comprises a planar light circuit 10 which is used as a beam combiner. The planar light circuit 10 comprises a waveguide 9 having N branches 15, 16. The branches 15, 16 merge together into a single branch 18 in combining regions 17. N−1 branches 15 comprise a curved shape, whereas one branch 16 is linear. The radiation emitting device 23 is for example used in spectroscopy applications.

In the case of in-line or imaging spectroscopy using the radiation emitting device 23, the laser diodes 24 are sequentially (not in any particular order) switch on such that the desired wavelength appears at a source port of the spectroscopy system and the detector detecting the currently applied excitation wavelength. Furthermore, more sophisticated schemes can be employed whereby all laser diodes 24 can be pulsed or modulated at the same time. For example, an orthogonal pulse sequences such as a Hadamard orthogonal set is used for modulation. Alternatively, each laser diode 24 is modulated at a different frequency which can be independently detected via lock-in or down-conversion schemes.

The features and exemplary embodiments described in connection with the figures can be combined with each other according to further exemplary embodiments, even if not all combinations are explicitly described. Furthermore, the exemplary embodiments described in connection with the figures may have alternative or additional features as described in the general part.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

REFERENCES 1 substrate
2 substrate layer
3 interlayer
4 waveguide layer
5 adhesion layer
6 adhesion promoter
7 photostructurable mask
8 channel
9 waveguide
10 planar light circuit
11 cladding
12, 13, 14 cleaving location
15 branch
16 middle branch
17 combining region
18 single branch
19 polymerized residue
20 bottom face
21 side face
22 top face
23 radiation emitting device
24 laser diode
N1, N2 refractive index curve
K1, K2 extinction coefficient curve
R ratio

We claim:

1. A method for producing a planar light circuit comprising
providing a substrate free of light producing regions,
depositing a waveguide layer,
applying a photostructurable mask on the waveguide layer,
photostructuring of the photostructurable mask such that the photostructurable mask is removed in regions,
etching of the waveguide layer in the regions such that channels are produced in the waveguide layer, wherein the channels confine waveguides and wherein a majority of the waveguide layer seen in top view remains on the substrate,
removal of the photostructurable mask,
singulating into a planar light circuit.

2. The method for producing a planar light circuit according to claim 1, wherein
the waveguide layer comprises a material selected from the following group: $SiN_x$, $SiO_xN_y$, GaN, $HfO_2$, $LiNbO_3$, $Ta_2O_5$, $Nb_2O_5$, $HfO_2$, $TiO_2$, Si and mixtures thereof.

3. The method for producing a planar light circuit according to claim 1, wherein
an adhesion layer is deposited on the waveguide layer before applying the photostructurable mask.

4. The method for producing a planar light circuit according to claim 1, wherein
an adhesion promoter is applied on the waveguide layer before applying the photostructurable mask.

5. The method for producing a planar light circuit according to claim 1, wherein
the waveguide layer is deposited by plasma-enhanced chemical vapor deposition.

6. The method for producing a planar light circuit according to claim 5, wherein
a low frequency plasma source is used in the plasma-enhanced chemical vapor deposition.

7. The method for producing a planar light circuit according to claim 1, wherein
the waveguide layer is etched by inductively coupled plasma etching.

8. The method for producing a planar light circuit according to claim 7, wherein
a reaction chamber for the inductively coupled plasma etching is cleaned before etching the waveguide layer.

9. The method for producing a planar light circuit according to claim 1, wherein
a cladding is applied on the waveguide layer after removal of the photostructurable mask.

10. A method for producing a planar light circuit comprising:
providing a substrate free of light producing regions;
depositing a waveguide layer;
applying a photostructurable mask on the waveguide layer;
photostructuring of the photostructurable mask such that the photostructurable mask is removed in regions;
etching of the waveguide layer in the regions such that channels are produced in the waveguide layer, wherein the channels confine waveguides and wherein a majority of the waveguide layer seen in top view remains on the substrate; and
removing the photostructurable mask,
singulating into a planar light circuit, wherein
an adhesion layer is deposited on the waveguide layer before applying the photostructurable mask,
an adhesion promoter is applied on the waveguide layer before applying the photostructurable mask,
a cladding is applied on the waveguide layer after removal of the photostructurable mask, and,
the channels are only partially filled with the cladding.

* * * * *